United States Patent
Kowata

(10) Patent No.: US 10,789,027 B2
(45) Date of Patent: Sep. 29, 2020

(54) INFORMATION PROCESSING AND PRINTING SYSTEM AND METHOD FOR USING SAME

(71) Applicant: SATO HOLDINGS KABUSHIKI KAISHA, Tokyo (JP)

(72) Inventor: Naoki Kowata, Tokyo (JP)

(73) Assignee: SATO HOLDINGS KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/332,532

(22) PCT Filed: Aug. 28, 2017

(86) PCT No.: PCT/JP2017/030690
§ 371 (c)(1),
(2) Date: Mar. 12, 2019

(87) PCT Pub. No.: WO2018/066266
PCT Pub. Date: Apr. 12, 2018

(65) Prior Publication Data
US 2019/0205072 A1    Jul. 4, 2019

(30) Foreign Application Priority Data
Oct. 7, 2016   (JP) .................................. 2016-198859

(51) Int. Cl.
*G06F 3/12*        (2006.01)
*H04N 1/387*       (2006.01)
(Continued)

(52) U.S. Cl.
CPC ............ *G06F 3/1243* (2013.01); *B41J 29/38* (2013.01); *G06F 3/1204* (2013.01);
(Continued)

(58) Field of Classification Search
CPC ........ G06F 3/1243; G06F 3/12; G06F 3/1204; G06F 3/1256; G06F 3/1284;
(Continued)

(56) References Cited

U.S. PATENT DOCUMENTS

| | | | |
|---|---|---|---|
| 5,091,868 A | 2/1992 | Pickens et al. | |
| 2009/0234707 A1* | 9/2009 | Perez | G06Q 10/08 705/300 |
| 2015/0239260 A1* | 8/2015 | De Munck | G06F 3/041 347/110 |

FOREIGN PATENT DOCUMENTS

| | | | |
|---|---|---|---|
| JP | 7-81150 A | 3/1995 | |
| JP | 7-121512 A | 5/1995 | |

(Continued)

OTHER PUBLICATIONS

Extended European Search Report, Application No. 17858105.4, dated Sep. 25, 2019, 7 pages.

*Primary Examiner* — Iriana Cruz
(74) *Attorney, Agent, or Firm* — Foley & Lardner LLP

(57) ABSTRACT

An embodiment of the present invention is a program that causes a computer to function as: means for preparing print layout data in accordance with an instruction of a user, the print layout data indicating print layout of print information corresponding to a print object that includes a fixed print object and a variable print object; and means for preparing screen layout data, by the computer in accordance with preparation of the print layout data, the screen layout data indicating screen layout that includes an input field for accepting input of print information corresponding to the variable print object.

14 Claims, 16 Drawing Sheets

(51) Int. Cl.
  *G09F 3/00*     (2006.01)
  *B41J 29/38*    (2006.01)
  *G06F 40/103*   (2020.01)
  *G06F 40/186*   (2020.01)
  *B41J 3/407*    (2006.01)
  *H04N 1/60*     (2006.01)

(52) U.S. Cl.
  CPC .......... *G06F 3/1208* (2013.01); *G06F 3/1242* (2013.01); *G06F 3/1256* (2013.01); *G06F 3/1284* (2013.01); *G06F 3/1285* (2013.01); *G06F 40/103* (2020.01); *G06F 40/186* (2020.01); *G09F 3/00* (2013.01); *H04N 1/387* (2013.01); *B41J 3/4075* (2013.01); *H04N 1/6011* (2013.01)

(58) Field of Classification Search
  CPC ...... G06F 3/1285; G06F 17/21; G06F 3/1208; G06F 3/1242; G06F 40/186; B41J 5/30; B41J 29/38; B41J 3/4075; G09F 3/00; H04N 1/387
  See application file for complete search history.

(56) References Cited

FOREIGN PATENT DOCUMENTS

| | | |
|---|---|---|
| JP | 2003-323582 A | 11/2003 |
| JP | 2004-259222 A | 9/2004 |
| JP | 2006-293682 A | 10/2006 |
| JP | 2010-260221 A | 11/2010 |
| JP | 2014-71584 A | 4/2014 |

\* cited by examiner

| PRINT ITEM DATA | | | |
|---|---|---|---|
| PRINT ITEM ID | PRINT LAYOUT ID | SCREEN LAYOUT ID | PRINT ITEM NAME |
| PI001 | PLO001 | SLO001 | ITEM1 |
| PI002 | PLO002 | SLO002 | ITEM2 |
| PI003 | PLO003 | SLO003 | ITEM3 |

FIG.3

| PRINT LAYOUT DATA (PRINT LAYOUT ID:PLO001) | | | | |
|---|---|---|---|---|
| PRINT OBJECT ID | PRINT OBJECT NAME | COORDINATE | TYPE | ARRANGEMENT ORDER |
| OBJ001 | Price | X1,Y1 | VTXT | 1 |
| OBJ002 | Barcode | X2,Y2 | FIMG | 2 |
| OBJ003 | Tax in | X3,Y3 | FTXT | 3 |
| OBJ004 | Date | X4,Y4 | DATE | 4 |
| OBJ005 | Name | X5,Y5 | LIST | 5 |

FIG.4

| SCREEN LAYOUT DATA (SCREEN LAYOUT ID:SLO001) | | | |
|---|---|---|---|
| PRINT OBJECT ID | DISPLAY ORDER | INPUT RULE | REFERENCE TABLE ID |
| OBJ001 | 1 | TEXTIN | N/A |
| OBJ004 | 2 | DATEIN | N/A |
| OBJ005 | 3 | LISTIN | TBL1 |

FIG.5

| REFERENCE TABLE (REFERENCE TABLEID:TBL001) ||
|---|---|
| CANDIDATE ID | CANDIDATE |
| LIST001 | ABC |
| LIST002 | BCD |
| LIST003 | CDE |

PRINT LAYOUT PREVIEW SCREEN
P208

IMG208

ABC

Tax in    120    2016/6/30

B208
PRINT

•B208

INFORMATION PROCESSING AND PRINTING SYSTEM AND METHOD FOR USING SAME

TECHNICAL FIELD

The present invention relates to an information processing apparatus, a printer, a program, and a method for processing information.

BACKGROUND ART

Recently, there has been a growing need, with a printer such as a label printer, for preparing layout of print information (hereinafter, called print layout) using a host computer connected to the printer and editing the print layout through a print screen displayed at the printer. To meet such a need, it is important to display, at a printer, a print screen matched to print layout.

Conventionally, there has been known a technology to prepare print layout using a host computer connected to a printer (e.g., Japanese Patent Application Laid-open H7-81150). Further, there has been known a technology to prepare layout of a print screen (hereinafter, called screen layout) using a host computer connected to a printer (e.g., Japanese Patent Application Laid-open 2004-259222).

SUMMARY OF THE INVENTION

Problems to be Solved by the Invention

However, according to the technologies of Japanese Patent Application Laid-open H7-81150 and Japanese Patent Application Laid-open 2004-259222, it is required to prepare the print layout and the screen layout separately. Accordingly, burdens therefor are heavy for a user. In particular, in the case of separately using multiple patterns of print layout, it is required for a user to prepare screen layout to be matched to each print layout. Accordingly, burdens therefor increase.

An object of the present invention is to reduce burdens for a user when print layout prepared using a host computer is edited through a print screen displayed at a printer.

Means for Solving the Problems

An embodiment of the present invention is a program that causes a computer to function as: means for preparing print layout data in accordance with an instruction of a user, the print layout data indicating print layout of print information corresponding to a print object that includes a fixed print object and a variable print object; and means for preparing screen layout data, by the computer in accordance with preparation of the print layout data, the screen layout data indicating screen layout that includes an input field for accepting input of print information corresponding to the variable print object.

BRIEF DESCRIPTION OF THE DRAWINGS

FIG. 3 is a table indicating a data structure of print item data of the present embodiment.

FIG. 4 is a table indicating a data structure of print layout data of the present embodiment.

FIG. 5 is a table indicating a data structure of screen layout data of the present embodiment.

FIG. 6 is a table indicating a data structure of a reference table of the present embodiment.

DETAILED DESCRIPTION OF THE INVENTION

Figure 1:
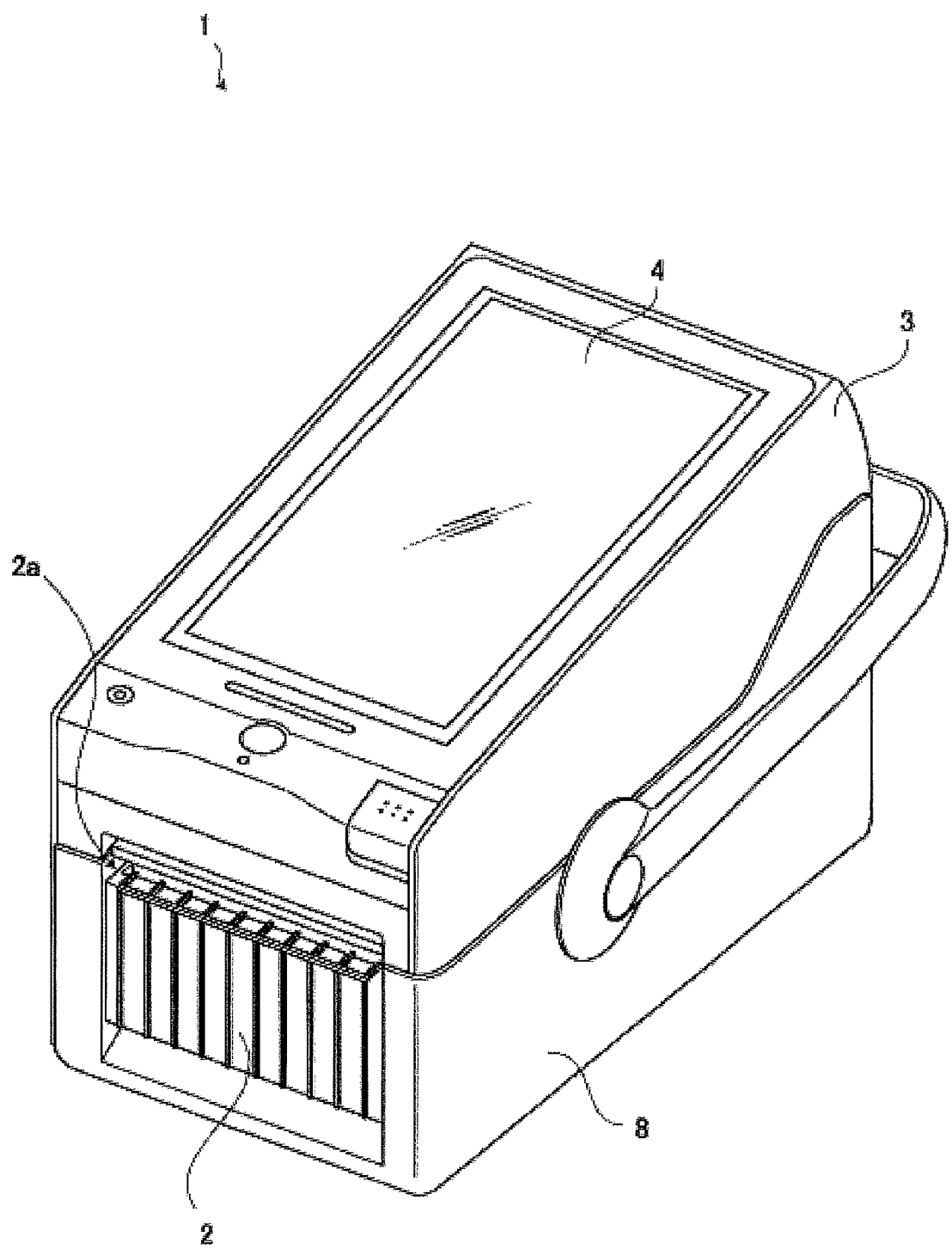
FIG. 1 is a perspective view of a printer of the present embodiment.

In the following, an embodiment of the present invention will be described in detail based on the drawings. Here, in the drawings for describing the present embodiment, the same structural element is basically provided with the same reference sign and description thereof will not be repeated.

(1) CONFIGURATION OF PRINTER

Description will be provided on a configuration of a printer of the present embodiment. FIG. 1 is a perspective view of the printer of the present embodiment.

As illustrated in FIG. 1, a printer 1 includes a front panel 2, a housing 8, a printer cover 3, and a touch panel display 4 (being an example of a display apparatus). The printer 1 is configured to print print information on a print medium. Examples of the print medium include a label with a liner, a continuous linerless label, a tag, and combinations thereof. Examples of the print information include characters, figures, marks, bar codes, and combinations thereof.

A rear end portion of the printer cover 3 is axially supported at a rear end portion of the housing 8. The printer cover 3 is movable (i.e., swingable) with respect to the housing 8 between a close position and an open position. The close position denotes a position where the printer cover 3 closes the housing 8, for example, to cause the inside of the housing 8 to be invisible from the outside of the printer 1. The open position denotes a position where the printer cover 3 opens the housing 8, for example, to cause the inside of the housing 8 to be visible from the outside of the printer 1.

An ejection port 2a is formed between the printer cover 3 and the housing 8. The ejection port 2a is configured to eject a print medium with print information printed.

The touch panel display 4 is placed on an upper face of the printer cover 3. The touch panel display 4 is configured to display specific information. The specific information includes information regarding the printer 1 and instruction key images. When a user touches an instruction key image, a processor of the printer 1 accepts an instruction corresponding to the instruction key image. For example, the touch panel display 4 is a liquid crystal display having a touch sensor.

(2) FUNCTIONAL BLOCKS OF PRINTER AND HOST COMPUTER

Figure 2:
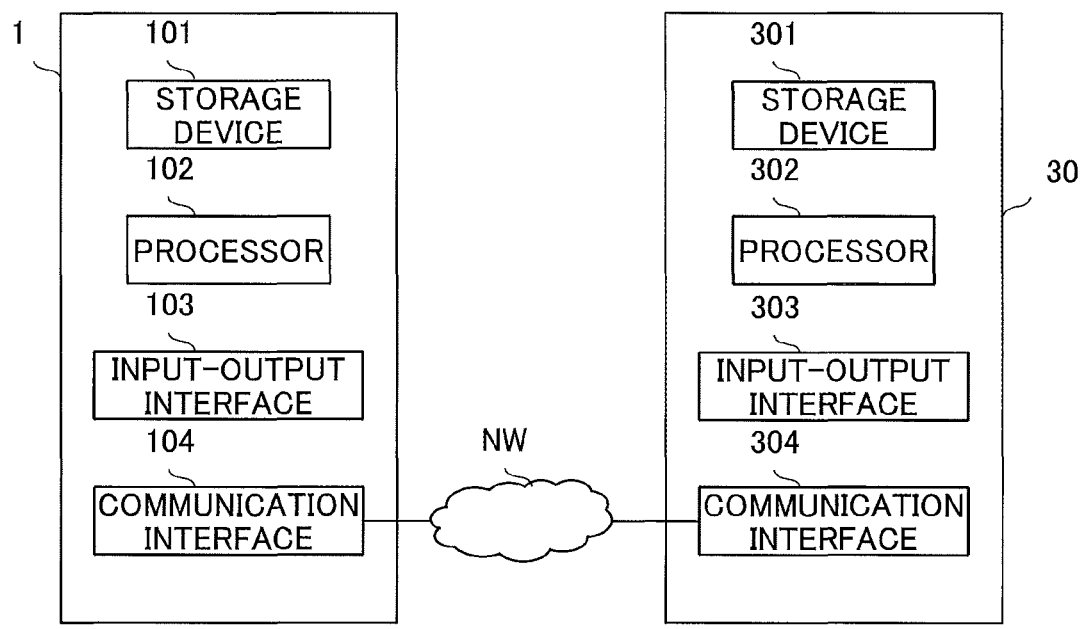
FIG. 2 is a functional block diagram of the printer and a host computer of the present embodiment.

Description will be provided on functional blocks of the printer and a host printer of the present embodiment. FIG. 2 is a functional block diagram of the printer and the host computer of the present embodiment.

As illustrated in FIG. 2, the printer 1 is connected to a host computer 30 (being an example of an information processing apparatus) through a network NW. For example, the host computer 30 is a smart phone, a tablet terminal, a personal computer, or a server. For example, the network NW is the Internet, an intranet, a local area network, or a combination thereof.

(2-1) Functional Blocks of Printer

Description will be provided on functional blocks of the printer in FIG. 2.

The printer 1 includes a storage device 101, a processor 102 (being an example of a control unit), an input-output interface 103, and a communication interface 104.

The storage device 101 is configured to store a program and data. For example, the storage device 101 is a combination of a read only memory (ROM), a random access memory (RAM), and a storage (e.g., a flash memory or a hard disk). The program includes a firmware program and a software program. The firmware program is a program for controlling hardware of the printer 1. The software program is a program for actualizing functions of the printer 1. The data includes control data to which the firmware refers and processing data to which the software refers.

The processor 102 is configured to actualize the functions of the printer 1 by activating the program stored in the storage device 101 and referring to the data stored in the storage device 101. Specifically, the processor 102 actualizes a communication control function, a display control function, an instruction accepting function, and print control function. For example, the processor 102 is a central processing unit (CPU).

The processor 102 actualizing the communication control function controls communication between the printer 1 and the host computer 30 through the communication interface 104. Owing to the communication control function, the printer 1 is connected to the network NW.

The processor 102 actualizing the display control function causes the touch panel display 4, through the input-output interface 103, to display information.

When a user touches an instruction key image displayed on the touch panel display 4, the processor 102 actualizing the instruction accepting function accepts, through the input-output interface 103, an instruction corresponding to the instruction key image touched by the user.

The processor 102 actualizing the print control function controls a print module of the printer 1. For example, the print module includes a thermal head, a platen roller, and a container. The container stores print media. The platen roller is configured to convey a print medium stored in the container. The thermal head is configured to print print information on the print medium conveyed by the platen roller.

The input-output interface 103 is configured to accept an instruction from the touch panel display 4 and to output information to the touch panel display 4 of the printer 1.

The communication interface 104 is configured to control communication between the printer 1 and the host computer 30 connected to the printer 1.

(2-2) Functional Blocks of Host Computer

Description will be provided on functional blocks of the host computer in FIG. 2.

The host computer 30 includes a storage device 301, a processor 302, an input-output interface 303, and a communication interface 304.

The storage device 301 is configured to store a program and data. For example, the storage device 301 is a combination of a ROM, a RAM, and a storage. The program includes a program of an operating system (OS) of the host computer 30 and a software program. The software program is a program for actualizing functions of the host computer 30. The software program includes a software program for preparing print layout (hereinafter, called a print layout preparing program). The data includes control data to which the OS refers and processing data to which the software refers.

The processor 302 is configured to actualize the functions of the host computer 30 by activating the program stored in the storage device 301 and referring to the data stored in the storage device 301. For example, the processor 302 is a CPU.

The input-output interface 303 is configured to accept an instruction from an input device (e.g., a keyboard, a mouse, or a combination thereof) of the host computer 30 and to cause a display device (e.g., a liquid crystal display) of the host computer 30 to display information.

The communication interface 304 is configured to control communication between the host computer 30 and the printer 1.

(3) DATABASE

Description will be provided on a database of the present embodiment.

(3-1) Print Item Data

Description will be provided on print item data of the present embodiment. FIG. 3 is a table indicating a data structure of the print item data of the present embodiment.

The print item data is data regarding print items. As illustrated in FIG. 3, the print item data includes a print item ID field, a print layout ID field, a screen layout ID field, and a print item name field. The fields are associated with one another. The print item data is stored in the storage device 301. The print item denotes a combination of print information to be print on a print medium.

Print item IDs each identifying a print item are stored in the print item ID field. Information in the print item ID field is determined by the host computer 30.

Print layout IDs each identifying a print layout are stored in the print layout ID field. Information in the print layout ID field is determined by the host computer 30. Print layout denotes a layout of print information to be print on a print medium.

Screen layout IDs each identifying a screen layout are stored in the screen layout ID field. Information in the screen layout ID field is determined by the host computer 30.

Screen layout denotes a layout of a print screen to be displayed on the touch panel display 4. The print screen is a screen for providing an instruction regarding the print information to the printer 1.

Information indicating print item names is stored in the print item name field. The information in the print item name field is determined arbitrarily by a user.

(3-2) Print Layout Data

Description will be provided on print layout data of the present embodiment. FIG. 4 is a table indicating a data structure of the print layout data of the present embodiment.

The print layout data is data regarding print layout. As illustrated in FIG. 4, the print layout data includes a print object ID field, a print object name field, a coordinate field, a type field, and an arrangement order field. The fields are associated with one another. The print layout data is associated with the print layout ID. The print layout data is stored in the storage device 301.

Print object IDs each identifying a print object are stored in the print object ID field. Information in the print object ID field is determined by the host computer 30. The print object is a structural element of the print information. That is, the print information includes at least one print object.

Information indicating a print object name is stored in the print object name field. The information in the print object name field is determined arbitrarily by a user.

Coordinates (being an example of first position information) indicating a position of the print object on a print medium (hereinafter, called a print position) are stored in the coordinate field. The information in the coordinate field is determined arbitrarily by a user.

Information indicating a type of the print object (hereinafter, called type information) is stored in the type field. "FTXT" denotes a fixed text (being an example of a fixed print object). The fixed text is a text not relying on an instruction provided to the printer 1. The fixed text cannot be varied by a user with the printer 1. "VTXT" denotes a variable text (being an example of a variable print object). The variable text is a text relying on an instruction provided to the printer 1. The variable text can be varied by a user with the printer 1. "FIMG" denotes a fixed image (being an example of the fixed print object). The fixed image is an image without relying on an instruction provided to the printer 1. The fixed image cannot be varied by a user with the printer 1. "DATE" denotes a date (being an example of the variable print object). An arbitrary date can be specified by a user with the printer 1. "LIST" denotes a list (being an example of the variable print object). The list includes a plurality of candidates. The respective candidates are texts, images, or combinations thereof. An arbitrary candidate can be specified among the plurality of candidates included in the list by a user with the printer 1.

Information indicating an arrangement order of the print objects in a print layout preparation screen (described later) is stored in the arrangement order field. The information in the arrangement order field is determined by the host computer 30.

(3-3) Screen Layout Data

Description will be provided on screen layout data of the present embodiment. FIG. 5 is a table indicating a data structure of the screen layout data of the present embodiment.

The screen layout data is data regarding screen layout. As illustrated in FIG. 5, the screen layout data includes a print object ID field, a display order field, an input rule field, and a reference table ID field. The fields are associated with one another. The screen layout data is associated with the screen layout ID. The screen layout data is stored in the storage device 301.

Print object IDs are stored in the print object ID field.

Information (being an example of second position information) indicating a display order (being an example of a display position) of the print object at the print screen (described later) is stored in the display order field. An initial value in the display order field is determined by the host computer 30. Further, the information in the display order field can be varied arbitrarily by the user.

Input rule information indicating an input rule of the print object at the print screen (described later) is stored in the input rule field. The information in the input rule field is determined arbitrarily by a user. "TEXTIN" denotes text input. Arbitrary texts can be specified by a user for the print object corresponding to the text input. "DATEIN" denotes date input. An arbitrary date can be specified by a user for the print object corresponding to the date input. "LISTIN" denotes list input. An arbitrary candidate can be specified among a plurality of candidates included in a reference table for the print object corresponding to the list input.

Reference table IDs each identifying a reference table (see FIG. 6) are stored in the reference table ID field. Information in the reference table ID field can be determined arbitrarily by a user. In the case that the input rule information "LISTIN" is stored in the input rule field, the reference table ID is stored in the reference table ID field.

(3-4) Reference Table

Description will be provided on a reference table of the present embodiment. FIG. 6 is a table indicating a data structure of the reference table of the present embodiment.

As illustrated in FIG. 6, the reference table (being an example of reference information) includes a candidate ID field and a candidate field. The fields are associated with one another. The reference table is associated with the reference table ID. The reference table is stored in the storage device 301.

Candidate IDs each identifying a candidate of the print information are stored in the candidate ID field. The information in the candidate ID field is determined by the host computer 30.

Candidates of the print information are stored in the candidate field. The information in the candidate field can be determined arbitrarily by a user.

(4) INFORMATION PROCESSING FLOW

Description will be provided on information processing flow of the present embodiment.

(4-1) Processing Flow for Preparing Print Layout

Figure 7:
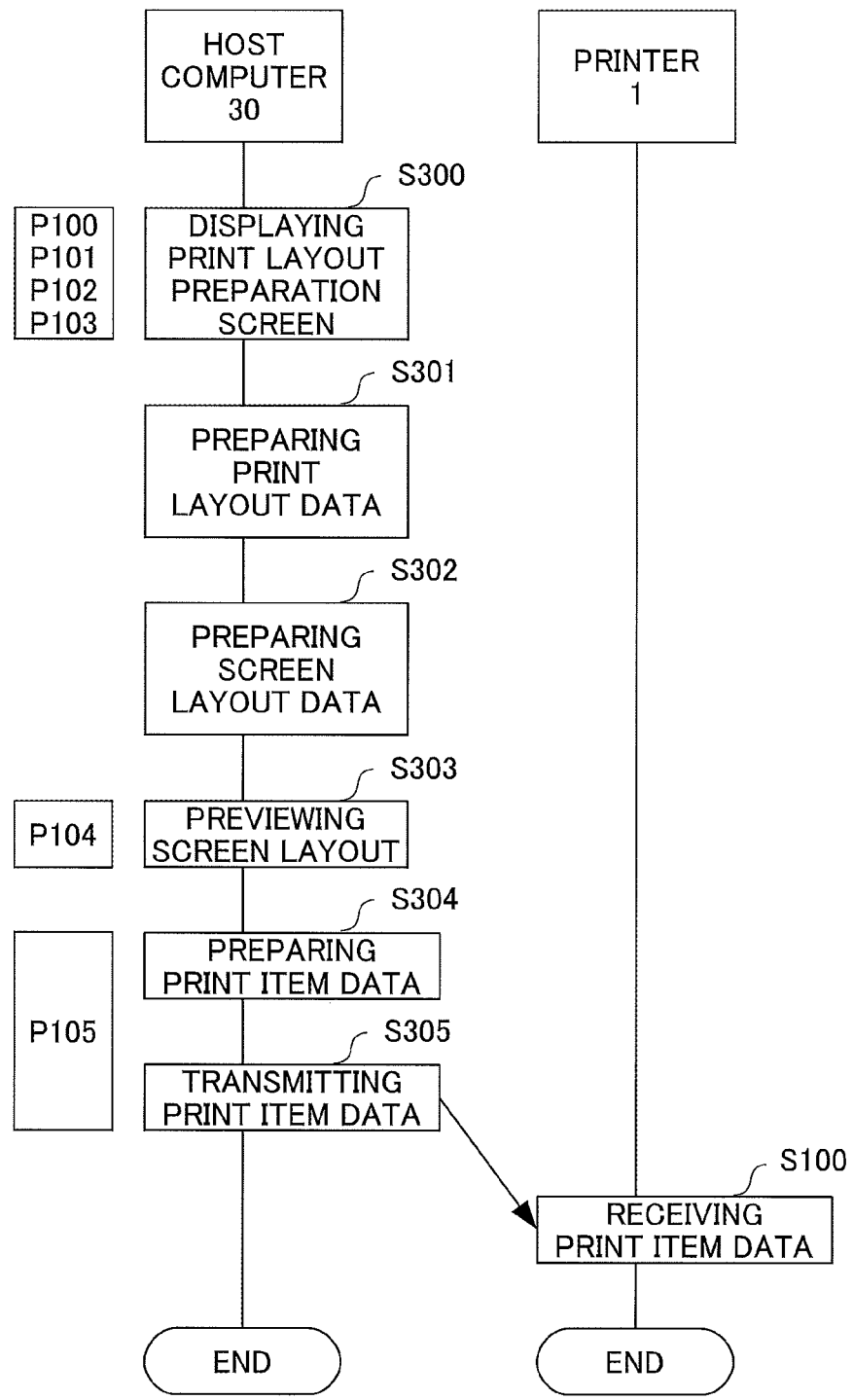
FIG. 7 is a sequence diagram of processing for preparing print layout of the present embodiment.
Figure 8:
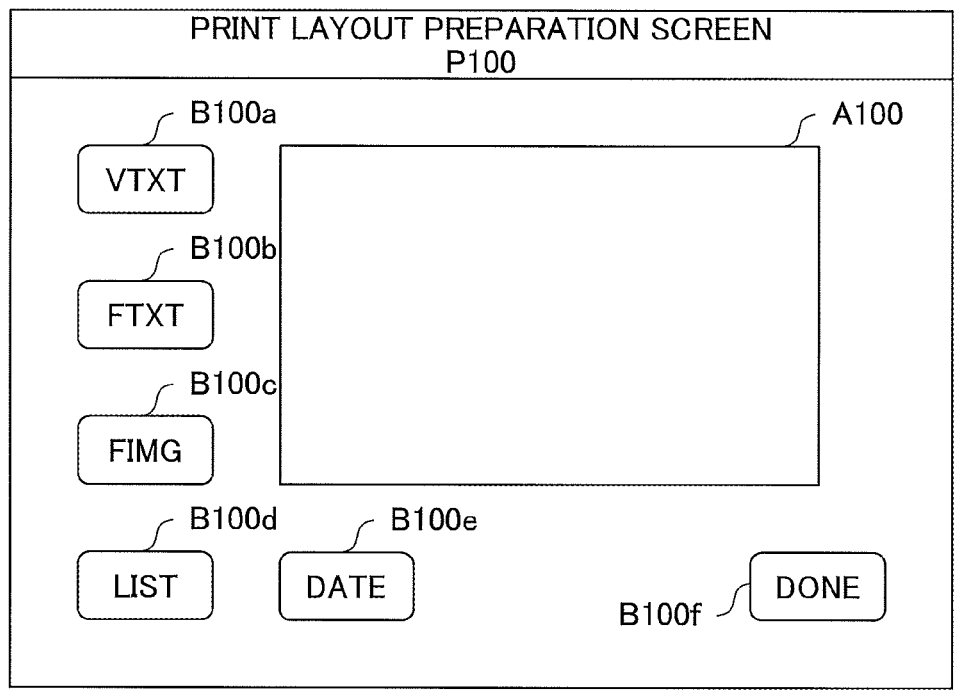
FIG. 8 is a view illustrating a screen example to be displayed with information processing of FIG. 7.
Figure 8:
Figure 8:
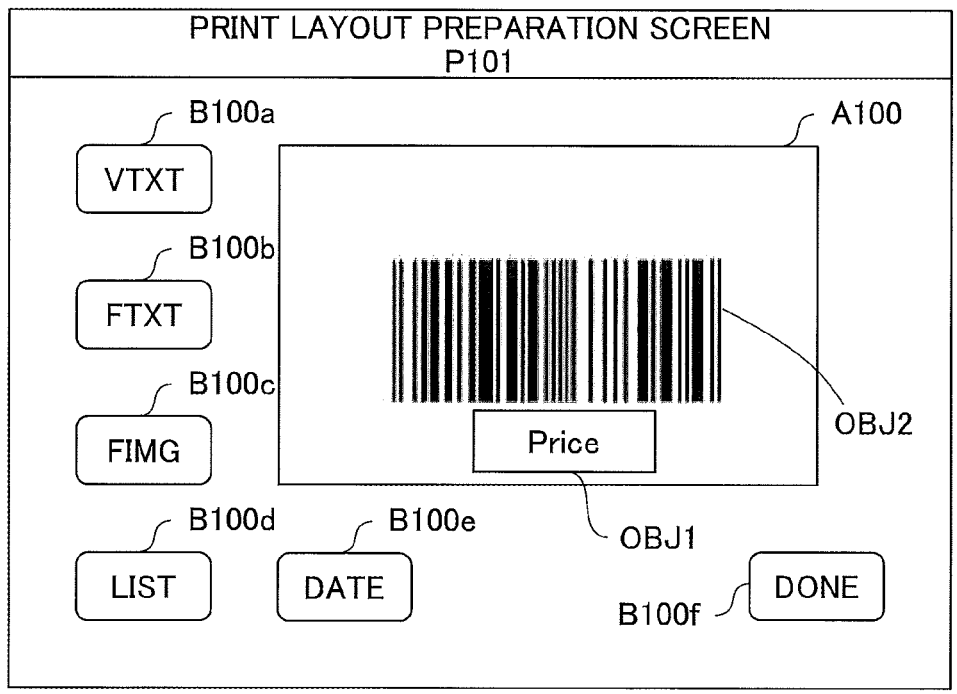
Figure 9:
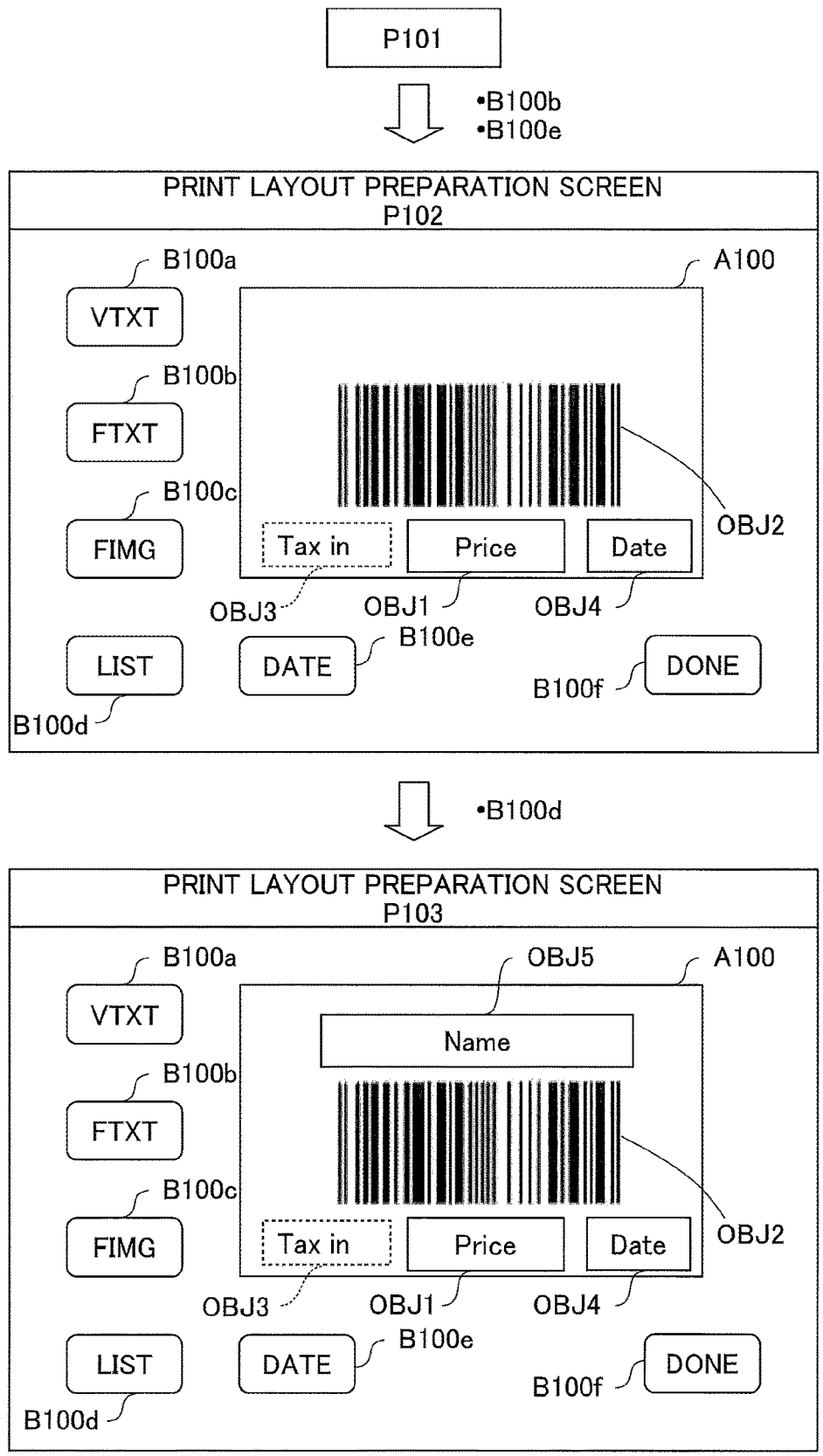
FIG. 9 is a view illustrating a screen example to be displayed subsequently to the screen example of FIG. 8.
Figure 10:
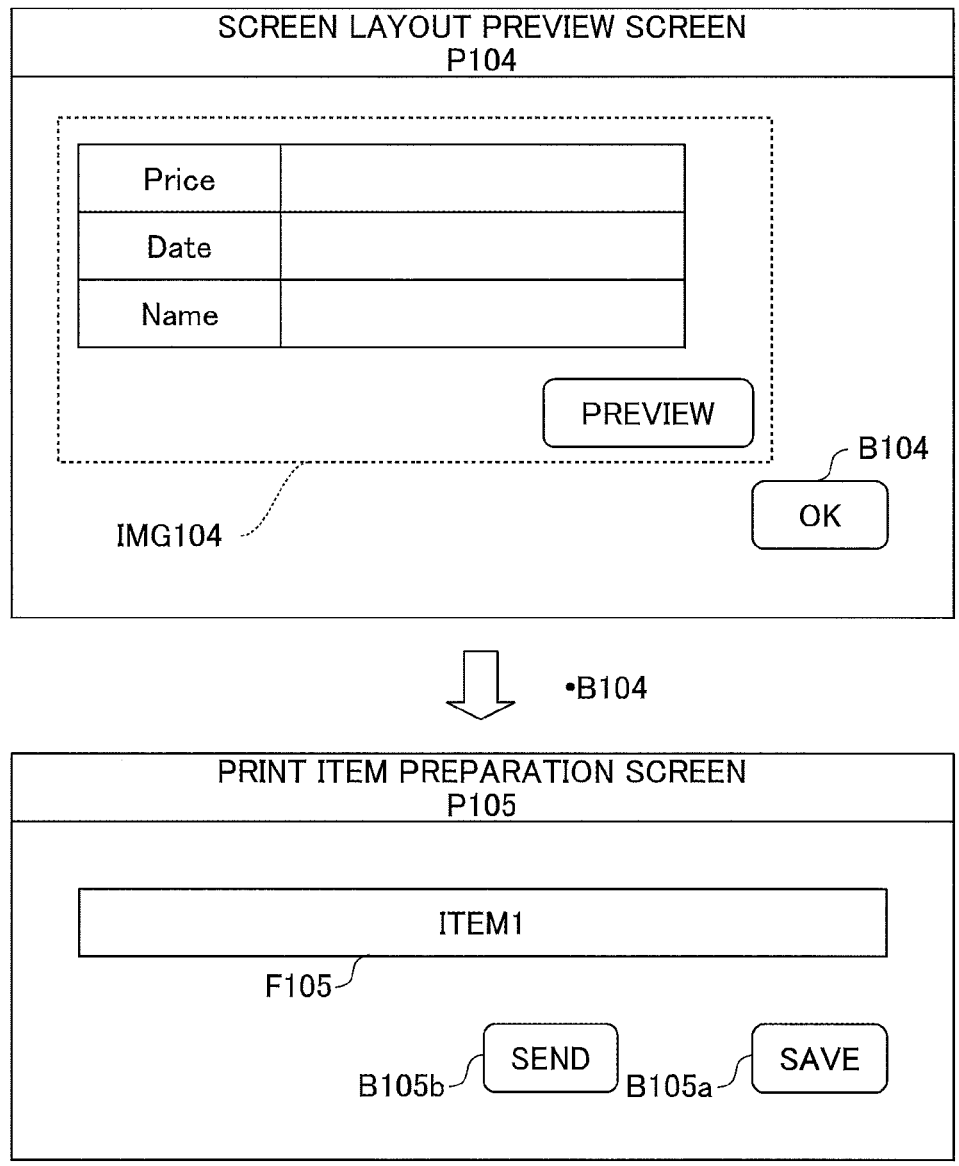
FIG. 10 is a view illustrating a screen example to be displayed subsequently to the screen example of FIG. 9.

Description will be provided on processing flow for preparing print layout of the present embodiment. FIG. 7 is a sequence diagram of processing for preparing print layout of the present embodiment. FIG. 8 is a view illustrating a screen example to be displayed with the information processing of FIG. 7. FIG. 9 is a view illustrating a screen example to be displayed subsequently to the screen example of FIG. 8. FIG. 10 is a screen example to be displayed subsequently to the screen example of FIG. 9.

As illustrated in FIG. 7, the host computer 30 performs displaying of a print layout preparation screen (S300).

Specifically, when an instruction to execute a print layout preparation program is provided by a user through an input device, the processor 302 executes the print layout preparation program stored in the storage device 301. The processor 302 causes the display device to display a print layout preparation screen P100 (FIG. 8).

As illustrated in FIG. 8, the print layout preparation screen P100 includes a display area A100 and instruction key images B100a to B100f.

The print layout prepared by the user is displayed at the display area A100.

The type information "VTXT" is allocated to the instruction key image B100a. When the instruction key image B100a is specified, an input field of the variable text appears at the display area A100.

The type information "FTXT" is allocated to the instruction key image B100b. When the instruction key image B100b is specified, the fixed text appears at the display area A100. At the print layout preparation screen, the user can select an arbitrary fixed text among a plurality of fixed texts or input an arbitrary fixed text using an input device.

The type information "FIMG" is allocated to the instruction key image B100c. When the instruction key image B100c is specified, a fixed image appears at the display area A100.

The type information "LIST" is allocated to the instruction key image B100d. When the instruction key image B100d is specified, an input field for list input appears at the display area A100.

The type information "DATE" is allocated to the instruction key image B100e. When the instruction key image B100e is specified, an input field for date input appears at the display area A100.

At the print layout preparation screen P100 (FIG. 8), when the user specifies the instruction key images B100a and B100c using the input device, the processor 302 causes the display device to display a print layout preparation screen P101 (FIG. 8).

As illustrated in FIG. 8, a display area A100 in the print layout preparation screen P101 is different from the display area A100 in the print layout preparation screen P100 in that print objects OBJ1 and OBJ2 are displayed thereat.

The print object OBJ1 is a print object placed in accordance with specifying of the instruction key image B100a. The print object OBJ1 is an input field for a variable text. A print object ID "OBJ001", a print object name "Price" arbitrarily determined by the user, coordinates indicating a position of the print object OBJ1, and an arrangement order number "1" are allocated to the print object OBJ1. For example, the print object OBJ1 is an object indicating a price of a product.

The print object OBJ2 is a print object placed in accordance with specifying of the instruction key image B100c. For example, the print object OBJ2 is a barcode image determined arbitrarily by the user. A print object ID "OBJ002", a print object name "Barcode" arbitrarily determined by the user, coordinates indicating a position of the print object OBJ2, and an arrangement order number "2" are allocated to the print object OBJ2.

At the print layout preparation screen P101 (FIG. 8), when the user specifies the instruction key images B100b and B100e using the input device, the processor 302 causes the display device to display a print layout preparation screen P102 (FIG. 9).

As illustrated in FIG. 9, a display area A100 in the print layout preparation screen P102 is different from the display area A100 in the print layout preparation screen P101 (FIG. 8) in that print objects OBJ3 and OBJ4 are displayed thereat.

The print object OBJ3 is a print object placed in accordance with specifying of the instruction key image B100b. The print object OBJ3 is a fixed text "Tax in" arbitrarily determined by the user. A print object ID "OBJ003", a print object name "Tax in" arbitrarily determined by the user, coordinates indicating a position of the print object OBJ3, and an arrangement order number "3" are allocated to the print object OBJ3.

The print object OBJ4 is a print object placed in accordance with specifying of the instruction key image B100e. The print object OBJ4 is an input field for date input. A print object ID "OBJ004", a print object name "Date" arbitrarily determined by the user, coordinates indicating a position of the print object OBJ4, and an arrangement order number "4" are allocated to the print object OBJ4. For example, the print object OBJ4 is an object indicating an expiration date of a product.

At the print layout preparation screen P102 (FIG. 9), when the user specifies the instruction key image B100d using the input device, the processor 302 causes the display device to display a print layout preparation screen P103 (FIG. 9).

As illustrated in FIG. 9, a display area A100 in the print layout preparation screen P103 is different from the display area A100 in the print layout preparation screen P102 in that a print object OBJ5 is displayed thereat.

The print object OBJ5 is a print object placed in accordance with specifying of the instruction key image B100d. The print object OBJ5 is an input field for list input. A print object ID "OBJ005", a print object name "Name" arbitrarily determined by the user, coordinates indicating a position of the print object OBJ5, and an arrangement order number "5" are allocated to the print object OBJ5. For example, the print object OBJ5 is an object indicating a name of a product.

As illustrated in FIG. 7, after S300, the host computer 30 performs preparing of print layout data (S301).

Specifically, when the user specifies the instruction key image B100f using the input device at the print layout preparation screen P103 (FIG. 9), the processor 302 prepares print layout data corresponding to the print layout displayed at the display area A100.

More specifically, the processor 302 allocates the print objects IDs "OBJ001" to "OBJ005" respectively to the print objects OBJ1 to OBJ5 displayed at the display area A100. The processor 302 associates the print object name, the coordinates, the type information, and the arrangement order numbers, that are allocated to the print objects OBJ1 to OBJ5, respectively with the print object IDs "OBJ001" to "OBJ005." The processor 302 associates a print layout ID "PLO001" with a combination of the print object IDs "OBJ001" to "OBJ005." Thus, the print layout data (FIG. 4) can be obtained. The processor 302 stores the obtained print layout data (FIG. 4) in the storage device 301.

After S301, the host computer 30 performs preparing of screen layout data (S302). That is, the host computer 30 prepares the screen layout data corresponding to preparing of the print layout data.

Specifically, the processor 302 specifies, in the print layout data (FIG. 4) prepared in S301, the print object IDs "OBJ001", "OBJ004", and "OBJ005" associated with the type information "VTXT", "DATE", or "LIST." Thus, the variable objects are specified.

The processor 302 associates display order numbers "1" to "3", in ascending sequence of the arrangement order number associated with the specified print object IDs "OBJ001", "OBJ004", and "OBJ005" in the print layout data, with the respective print object IDs. Thus, the display order of the variable objects at the print screen is determined.

The processor 302 associates the input rules corresponding to the type information, associated with the specified print object IDs "OBJ001", "OBJ004", and "OBJ005" in the print layout data, with the respective print object IDs. More specifically, since the type information "VTXT" is associated with the print object ID "OBJ001" in the print layout data, the processor 302 associates the input rule information "TEXTIN" with the print object ID "OBJ001." Further, since the type information "DATE" is associated with the print object ID "OBJ004" in the print object data, the processor 302 associates the input rule information "DATEIN" with the print object ID "OBJ004." Further, since the type information "LIST" is associated with the print object ID "OBJ005" in the print object data, the processor 302 associates the input rule information "LISTIN" with the print object ID "OBJ005."

The processor 302 associates a reference table "TBL1" arbitrarily determined by the user with the print object ID "OBJ005" associated with the input rule information "LISTIN." The processor 302 associates a screen layout ID "SLO001" with a combination of the print object IDs "OBJ001", "OBJ004", and "OBJ005." Thus, the screen layout data (FIG. 5) is obtained.

The processor 302 stores the obtained screen layout data (FIG. 5) in the storage device 301.

As illustrated in FIG. 7, after S302, the host computer 30 performs previewing of the screen layout (S303).

Specifically, the processor 302 causes the display device to display a screen layout preview screen P104 (FIG. 10).

As illustrated in FIG. 10, the screen layout preview screen P104 includes an instruction key image B104 and an image IMG104.

The image IMG 104 is a preview image of the print screen corresponding to the screen layout data prepared in S302.

As illustrated in FIG. 7, after S303, the host computer 30 performs preparing the print item data (S304).

Specifically, when the user specifies the instruction key image B104 using the input device at the screen layout preview screen P104 (FIG. 10), the processor 302 causes the display device to display a print item preparation screen P105 (FIG. 10).

As illustrated in FIG. 10, the print item preparation screen P105 includes instruction key images B105a and B105b and an input field F105.

The input field F105 is an input field for inputting a print item name.

When the user inputs an arbitrary print item name "ITEM1" to the input field F105 using the input device and specifies the instruction key image B105a at the print item preparation screen P105, the processor 302 stores, in the storage device 301, the print item data (FIG. 3) in which the print layout ID "PLO001" that specifies the print layout data prepared in S301, the screen layout ID "SLO001" that specifies the screen layout data prepared in S302, the print item name that is input to the input field F105, and a print item ID "PI001" are associated with one another.

As illustrated in FIG. 7, after S304, the host computer 30 performs transmitting of the print item data (S305).

Specifically, when the user specifies the instruction key image B105b using the input device at the print item preparation screen P105 (FIG. 10), the processor 302 transmits the print item data prepared in S304 to the printer 1. The print item data to be transmitted to the printer 1 includes the print layout data specified by the print layout ID "PLO001" (i.e., the print layout data prepared in S302) and the screen layout data specified by the screen layout ID "SLO001" included in the print item data (i.e., the screen layout data prepared in S303).

The printer 1 performs receiving of the print item data (S100).

Specifically, the processor 102 receives the print item data transmitted from the host computer 30. The processor 102 stores the received print item data in the storage device 101.

(4-2) Print Processing Flow

Figure 11:
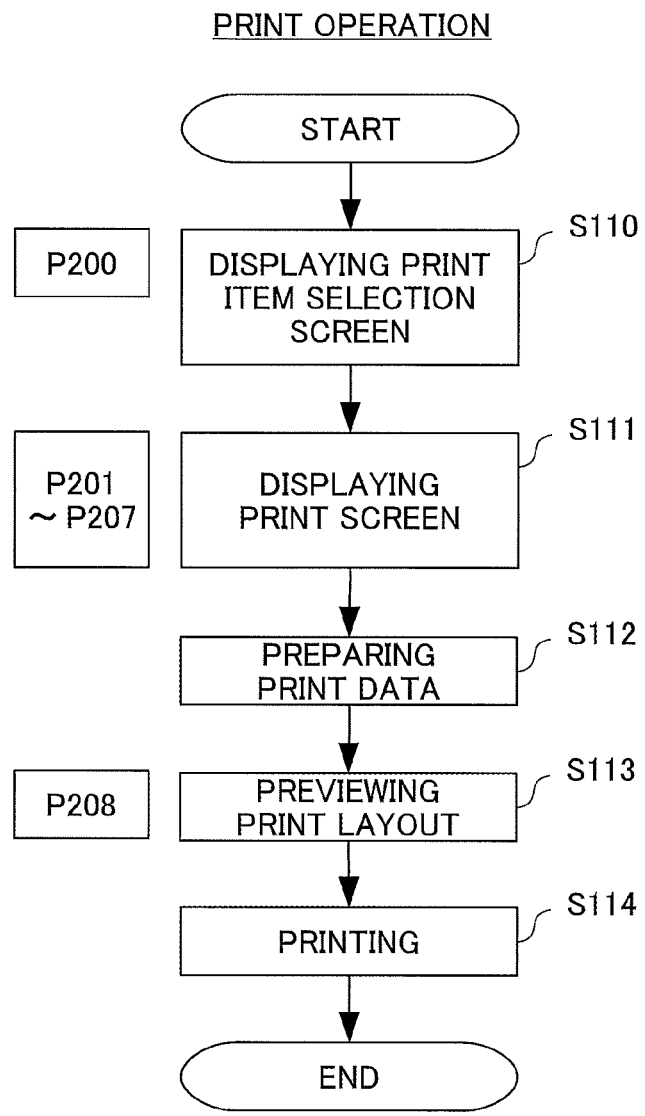
FIG. 11 is a flowchart of print processing of the present embodiment.
Figure 12:
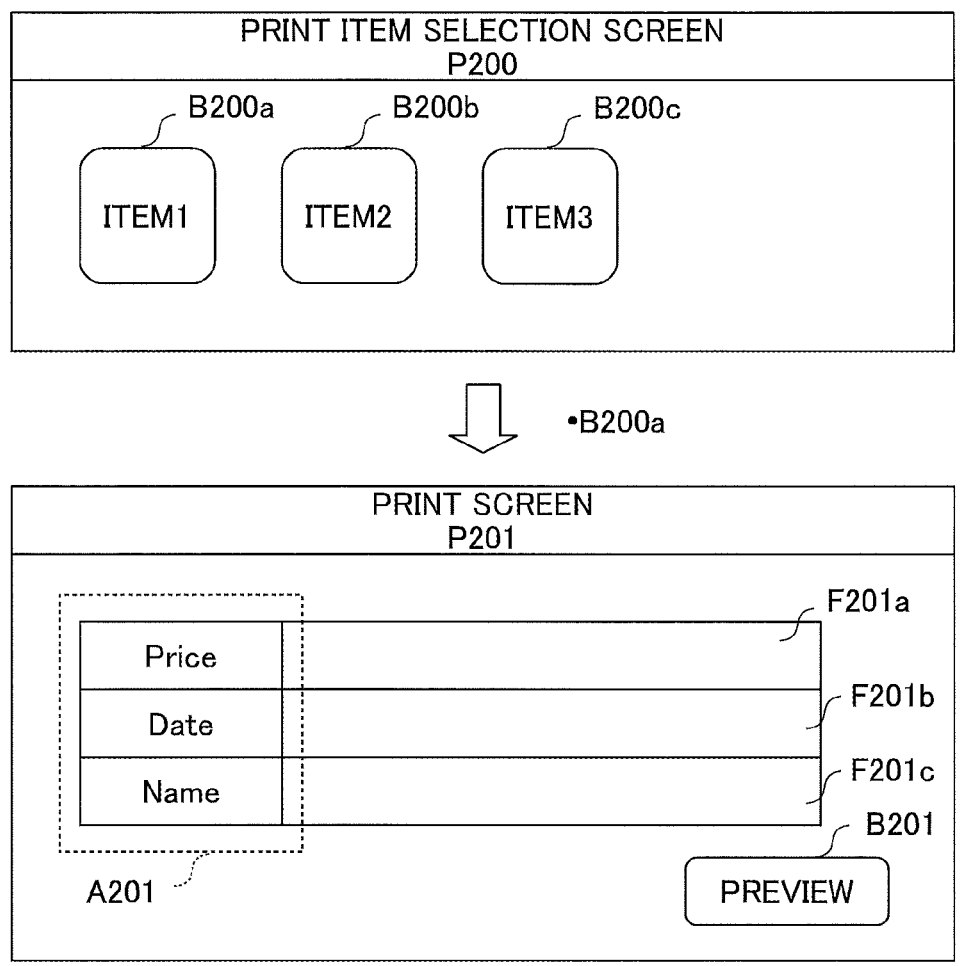
FIG. 12 is a view illustrating a screen example to be displayed in information processing of FIG. 11.
Figure 13:
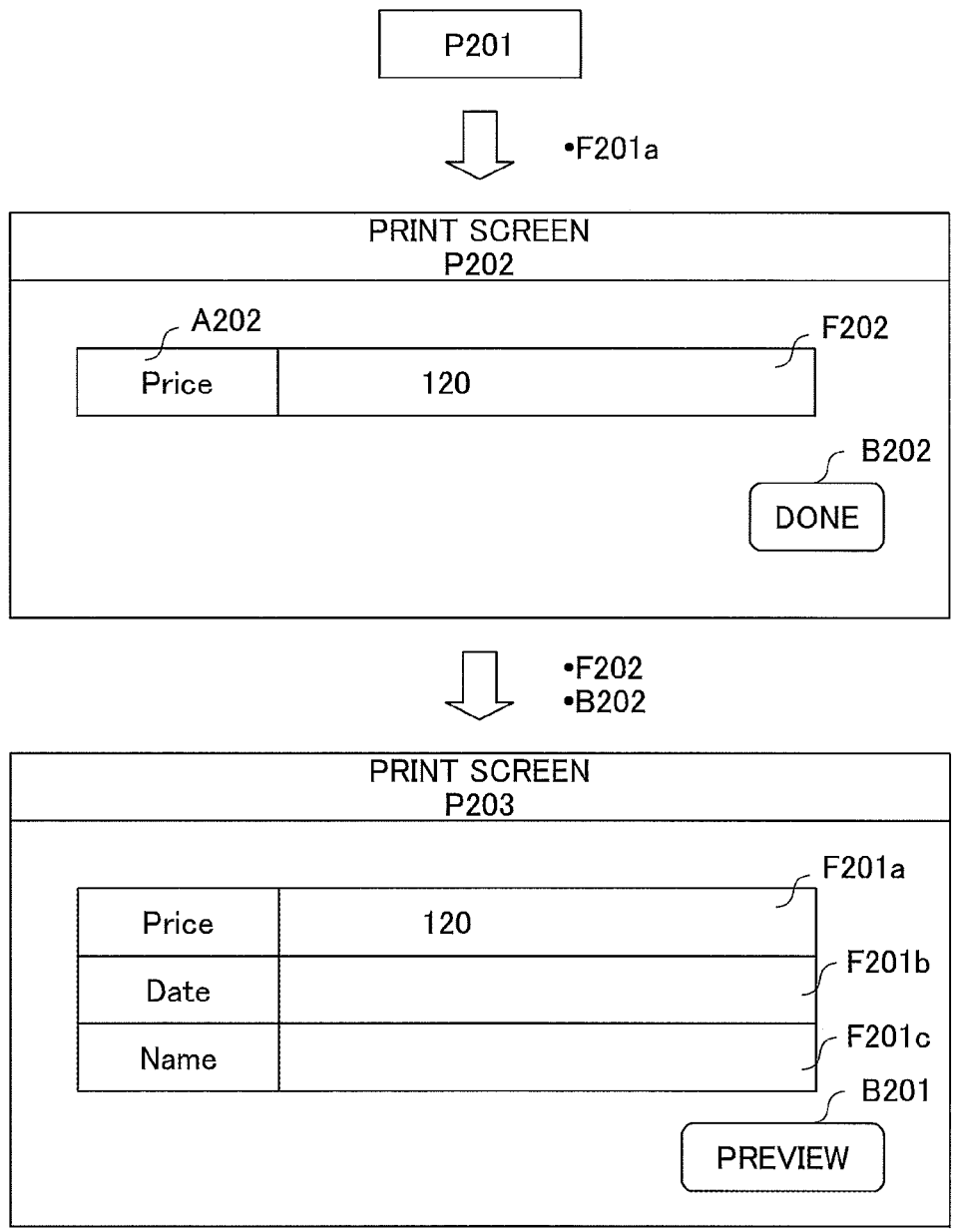
FIG. 13 is a view illustrating a screen example to be displayed subsequently to the screen example of FIG. 12.
Figure 14:
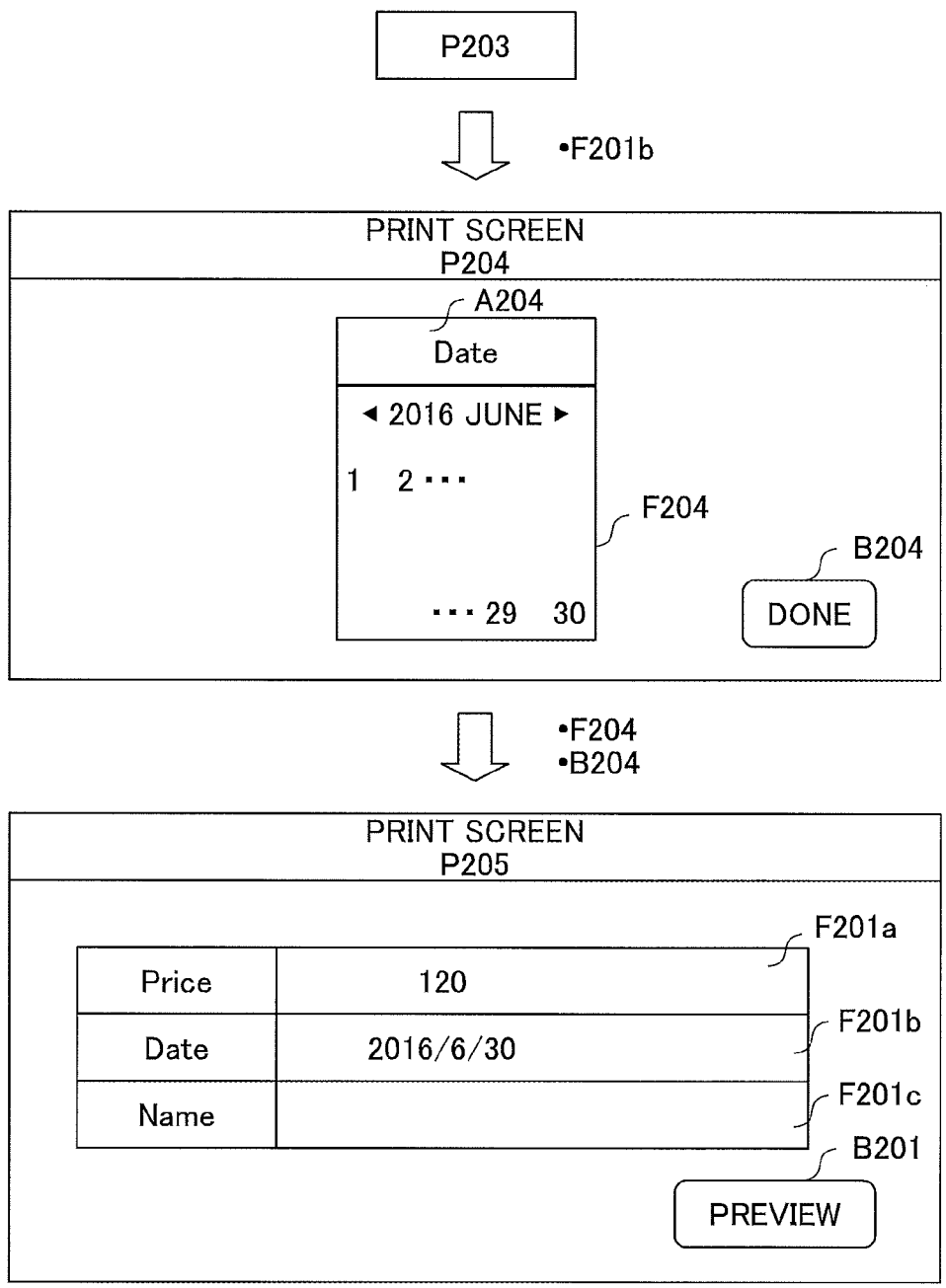
FIG. 14 is a view illustrating a screen example to be displayed subsequently to the screen example of FIG. 13.
Figure 15:
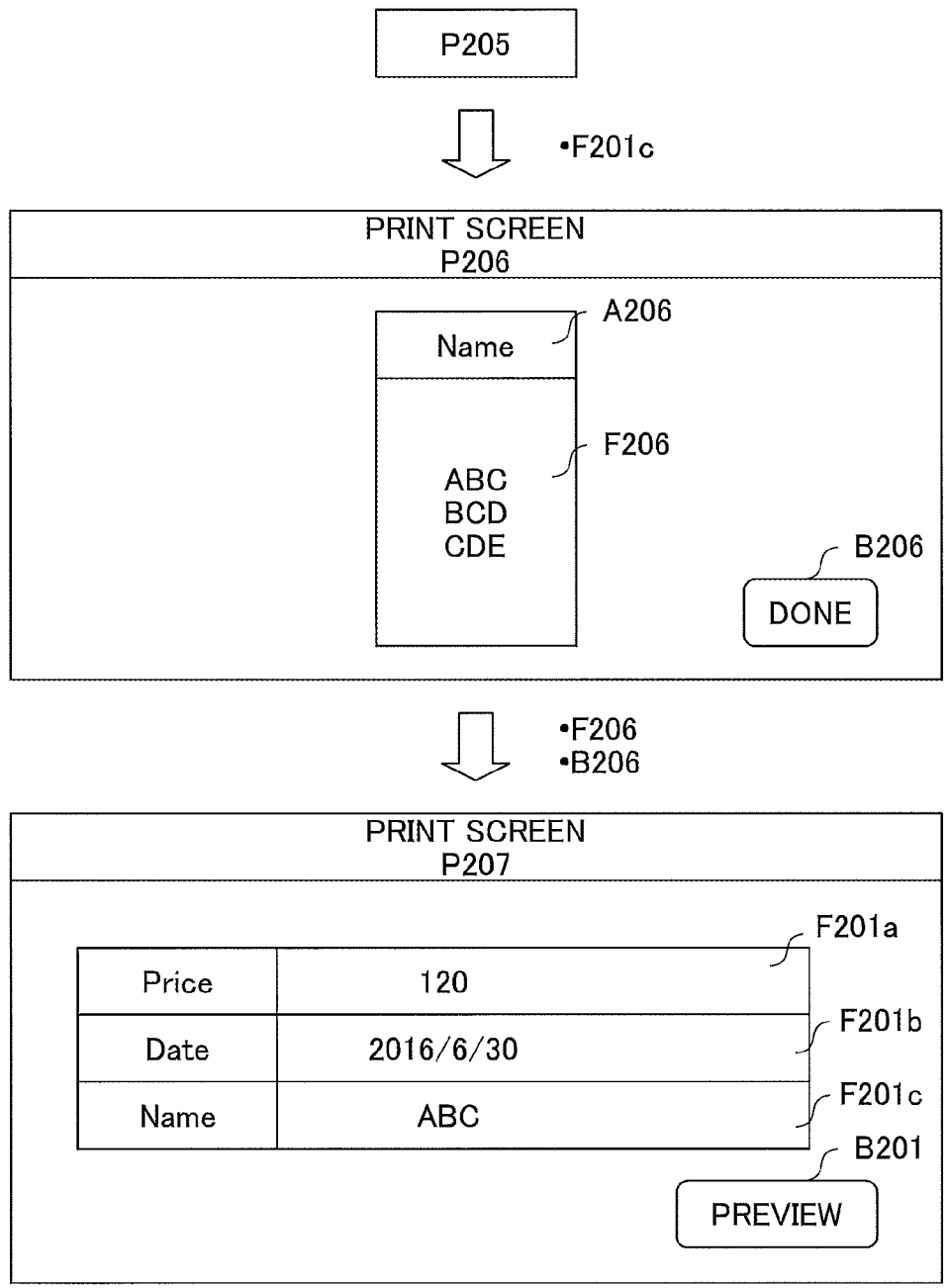
FIG. 15 is a view illustrating a screen example to be displayed subsequently to the screen example of FIG. 14.
Figure 16:
FIG. 16 is a view illustrating a screen example to be displayed subsequently to the screen example of FIG. 15.
Figure 16:
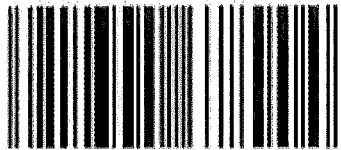
Figure 16:

Description will be provided on print processing flow of the present embodiment. FIG. 11 is a flowchart of print processing of the present embodiment. FIG. 12 is a view illustrating a screen example to be displayed in information processing of FIG. 11. FIG. 13 is a view illustrating a screen example to be displayed subsequently to the screen example of FIG. 12. FIG. 14 is a view illustrating a screen example to be displayed subsequently to the screen example of FIG. 13. FIG. 15 is a view illustrating a screen example to be displayed subsequently to the screen example of FIG. 14. FIG. 16 is a view illustrating a screen example to be displayed subsequently to the screen example of FIG. 15.

As illustrated in FIG. 11, the printer 1 performs displaying of a print item selection screen (S110).

Specifically, the processor 102 causes the touch panel display 4 to display a print item selection screen P200 (FIG. 12).

As illustrated in FIG. 12, the print item selection screen P200 includes instruction key images B200a to B200c. Print item IDs "PI001" to "PI003" are allocated to the instruction key images B200a to B200c.

As illustrated in FIG. 11, after S110, the printer 1 performs displaying of a print screen (S111).

Specifically, when the user specifies the instruction key image B200a using the touch panel display 4 at the print item selection screen P200 (FIG. 12), the processor 102 identifies the screen layout ID "SLO001" associated with the print item ID "PI001" allocated to the instruction key image B200a. The processor 102 causes the touch panel display 4 to display a print screen P201 (FIG. 12) corresponding to the screen layout data identified by the identified screen layout ID "SLO001."

As illustrated in FIG. 12, the print screen P201 includes a display area A201, an instruction key image B201, and input fields F201a to F201c.

Print object names "Price", "Date", and "Name" associated with the print object IDs "OBJ001", "OBJ004", and "OBJ005" included in the identified screen layout ID "SLO001" in the screen layout data (FIG. 5) are displayed at the display area A201.

The print object IDs "OBJ001", "OBJ004", and "OBJ005" included in the identified screen layout ID "SLO001" are allocated to the input fields "F201a" to "F201c", respectively.

When the user specifies the input field F201a using the touch panel display 4 at the print screen P201 (FIG. 12), the processor 102 causes the touch panel display 4 to display a print screen P202 (FIG. 13) corresponding to the print object ID "OBJ001" allocated to the input field "F201a."

As illustrated in FIG. 13, the print screen P202 includes a display area A202, an instruction key image B202, and an input field F202.

The print object name associated with the print object ID "OBJ001" is displayed at the display area A202.

The input field F202 is an input field for inputting a variable text. An input rule for the input field F202 is determined by the input rule information associated with the print object ID "OBJ001" in the screen layout data (FIG. 5).

When the user inputs a variable text to the input field F202 using the touch panel display 4 and specifies the instruction key image B202 at the print screen P202, the processor 102 causes the touch panel display 4 to display a print screen P203.

When the user specifies the input field F201b using the touch panel display 4 at the print screen P203, the processor 102 causes a print screen P204 (FIG. 14) corresponding to the print object ID "OBJ004" allocated to the input field F201b.

As illustrated in FIG. 14, the print screen P204 includes a display area A204, an instruction key image B204, and an input field F204.

The print object name associated with the print object ID "OBJ004" is displayed at the display area A204.

The input field F204 is an input field for inputting a date. An input rule for the input field F204 is determined by the input rule information associated with the print object ID "OBJ004" in the screen layout data (FIG. 5). For example, in the case that the input rule information indicates date input, it is possible to specify an arbitral date among dates displayed in a calendar format.

When the user specifies a date in the input field F204 using the touch panel display 4 and specifies the instruction key image B204 at the print screen P204, the processor 102 causes the touch panel display 4 to display a print screen P205.

When the user specifies the input field F201c using the touch panel display 4 at the print screen P205, the processor 102 causes the touch panel display 4 to display a print screen P206 (FIG. 15) corresponding to the print object ID "OBJ005" allocated to the input field F201c.

As illustrated in FIG. 15, the print screen P206 includes a display area A206, an instruction key image B206, and an input field F206.

The print object name associated with the print object ID "OBJ005" is displayed at the display area A206.

The input field F206 is an input field for list input. A plurality of candidates to be displayed in the input field F206 are determined by the reference table ID "TBL1" (FIG. 5) associated with the print object ID "OBJ005" in the screen layout data (FIG. 5).

When the user specifies a candidate in the input field F206 and specifies the instruction key image B206 at the print screen P206, the processor 102 causes the touch panel display 4 to display a print screen P207.

As illustrated in FIG. 11, after S111, the printer 1 performs preparing of print data (S112).

When the user specifies the instruction key image B201 using the touch panel display 4 at the print screen P207 (FIG. 15), the processor 102 prepares print data. The print data includes variable print information, print position information of the variable print information, fixed print information, and print position information of the fixed print information. The variable print information is information input to the input fields F201a to F201c in S111. The print position information of the variable print information denotes coordinates associated with the type information "VTXT", "DATE", and "LIST" in the print layout data (being an example of first print layout data) identified by the print layout ID "PLO001" associated with the print item ID "PI001" allocated to the instruction key image B200a. The fixed print information is print information corresponding to the print objects associated with the type information "FIMG" and "FTXT" (i.e., the fixed print objects) in the print layout data. The print position information of the fixed print information denotes coordinates associated with the type information "FIMG" and "FTXT" in the print layout data.

As illustrated in FIG. 11, after S112, the printer 1 performs previewing of print layout (S113).

Specifically, the processor 102 causes the touch panel display 4 to display a print layout preview screen P208 (FIG. 16).

As illustrated in FIG. 16, the print layout preview screen P208 includes an image IMG208 and an instruction key image B208.

The image IMG208 is a preview image of a print medium on which the print information corresponding to the print data prepared in S112 is printed.

As illustrated in FIG. 11, after S113, the printer 1 performs printing (S114).

Specifically, when the user specifies the instruction key image B208 at the print layout preview screen P208 (FIG. 16), the processor 102 prints the print information corresponding to the print data prepared in S112 on a print medium and discharges the print medium with the print information printed to the ejection port 2a, by controlling the thermal head and the platen roller.

According to the present embodiment, the host computer 30 transmits the print item data to the printer 1. The print item data includes the print layout data and the screen layout data corresponding to the print layout data. Accordingly, it is possible to reduce burdens for a user to edit, through the print screen P201 displayed at the printer 1, print layout prepared using the host computer 30.

(5) MODIFIED EXAMPLES

In the following, description will be provided on modified examples of the present embodiment.

(5-1) First Modified Example

A first modified example will be described. The first modified example exhibits an example to store print item data for each of users in the storage device 301.

A processor 302 of the first modified example associates a user ID and print item data with each other and adds them to the print item data (FIG. 3) in S304 (FIG. 7). The process in S305 is eliminated.

The processor 102 of the first modified example receives the user ID from a user in S110 (FIG. 11). The processor 102 reads out, from the host computer 30, the print item data (FIG. 3) associated with the user ID input by the user. The processor 102 causes the touch panel display 4 to display the print item selection screen P200 (FIG. 12) including the instruction key images B200a to B200c to which the print item IDs included in the read print item data are allocated.

(5-2) Second Modified Example

A second modified example will be described. The second modified example exhibits an example of editing print layout.

The host computer 30 in the second modified example edits the print layout data prepared in S301 based on an instruction of a user.

As an example, when the user provides an instruction to eliminate the print object OBJ5 (FIG. 9) using the input device, the processor 302 eliminates a record including the print object ID "OBJ005" allocated to the print object OBJ5 from the print layout data (FIG. 4) and the screen layout data (FIG. 5). Thus, after the user edits the print layout, the screen layout is prepared corresponding to the edited print layout.

(5-3) Third Modified Example

A third modified example will be described. The third modified example exhibits an example of editing screen layout.

The host computer 30 in the third modified example edits the screen layout data prepared in S302 based on an instruction of a user.

As an example, when the user provides an instruction to eliminate the input field F201c using the input device, the processor 302 eliminates a record including the print object ID "OBJ005" allocated to the input field F201c from the print layout data (FIG. 4) and the screen layout data (FIG. 5). Thus, after the user edits the screen layout, the print layout is prepared corresponding to the edited screen layout.

As another example, when the user provides an instruction to change the display order of the input fields F201a to F201c using the input device, the processor 302 changes the display order included in the screen layout data.

(5-4) Fourth Modified Example

A fourth modified example will be described. The fourth modified example exhibits an example in which the print layout data and the screen layout data are concurrently prepared.

The processor 302 in the fourth modified example causes the display device to display the print layout preparation screen P100 (FIG. 8) and the screen layout preview screen P104 (FIG. 10). The processor 302 updates the print layout preparation screen P100 and the image IMG104 (FIG. 10) each time when any of the instruction key images B100a, B100d, and B100e (FIG. 8) is specified in S300.

According to the fourth modified example, the screen layout corresponding to the updated print layout is displayed each time when the print layout is updated. Accordingly, the user can prepare the print layout while viewing a preview image of the screen layout.

(5-5) Fifth Modified Example

A fifth modified example will be described. The fifth modified example exhibits an example of eliminating previewing (S113) of the print layout in FIG. 11.

The processor 302 in the fifth modified example prepares the screen layout including the instruction key image B208 (FIG. 16) for instructing printing in S302 (FIG. 7). When the user specifies the instruction key image B208 at the print screen in S111 (FIG. 11), the processor 102 prints, on a print medium, the print information (S114) corresponding to the print data prepared in S112.

(5-6) Sixth Modified Example

A sixth modified example will be described. The sixth modified example exhibits an example in which a barcode image is treated as the variable object.

A type information "BARCODE" is allocated to the instruction key image B100c (FIG. 8) of the sixth modified example. When the instruction key image B100c is specified, an input field for a barcode number appears at the display area A100.

The type information "BARCODE" denotes barcode information. The barcode information is a combination of the barcode number and a barcode image corresponding to the barcode number. The user can cause the printer 1 to print any barcode information by specifying an arbitrary barcode number.

When the user specifies the instruction key image B100c (FIG. 8) using the input device in S300 (FIG. 7), the processor 302 causes the display device to display the print layout preparation screen including the print object corresponding to the input field for the barcode number. The print object ID, the specific print object name "BARCODE", coordinates indicating a position of the print object, and an arrangement order number are allocated to the print object.

In S302 (FIG. 7), the processor 302 identifies the print object ID associated with the type information "BARCODE." The processor 302 associates input rule information "BARCODENO" with the print object ID with which the type information "BARCODE" is associated in the print layout data. The input rule information "BARCODENO" is for inputting a barcode number having a specific number of digits.

The processor 102 displays the print screen including the input field for the barcode number in S111 (FIG. 11). When the user specifies the input field for the barcode number using the touch panel display 4 at the print screen, the processor 102 displays an instruction key image (e.g., a numeric keypad image) for inputting barcode number. When the user specifies an arbitrary barcode number using the touch panel display 4, the processor 102 generates a barcode image corresponding to the specified barcode number.

The processor 102 prepares print data including the generated barcode image in S112 (FIG. 11).

According to the sixth modified example, the host computer 30 prepares the print layout data including the input field for the barcode number. The printer 1 generates the barcode image corresponding to the barcode number input by the user. Accordingly, even in the case that a barcode image is treated as the variable object, burdens for the user can be reduced.

(6) OTHER MODIFIED EXAMPLES

Other modified examples will be described.

The storage devices 101 and 301 may be connected to the printer 1 and the host computer 30, respectively, through the network NW.

The storage devices 101 and 301 may be detachably attachable, respectively, to the printer 1 and the host computer 30. In this case, the process of S305 in FIG. 7 is eliminated. When a user disconnects the storage device 301 from the host computer 30 and connects the storage device 301 to the printer 1, the processor 102 stores, in the storage device 101, the print item data, print layout data, and the screen layout data stored in the storage device 301.

The printer 1 may be directly connected to the host computer 30 by wire or by air without through the network NW.

In the above, although description is provided in detail on the embodiments of the present invention, the scope of the present invention is not limited to the above embodiments. Further, the embodiments may be modified or varies without departing from the scope of the present invention. Further, the embodiments and modified examples thereof described above may be combined.

DESCRIPTION OF REFERENCE NUMERALS

1: Printer
2: Front panel
2a: Ejection port
3: Printer cover
4: Touch panel display
8: Housing
30: Host computer
101: Storage device
102: Processor
103: Input-output interface
104: Communication interface
301: Storage device
302: Processor
303: Input-output interface
304: Communication interface

The invention claimed is:

1. A system comprising an information processing apparatus configured to communicate with a printer, the information processing apparatus comprising:
a first storage device configured to store a first program, the first program enabling a computer to:
prepare print layout data in accordance with an instruction of a user, the prepared print layout data indicating a print layout including first print information corresponding to a print object that includes a fixed print object and a variable print object; and
prepare screen layout data in accordance with the prepared print layout data, the prepared screen layout data indicating a screen layout including an input field configured to accept an input of second print information corresponding to the variable print object; and
a communication interface configured to transmit the prepared print layout data and the prepared screen layout data to the printer; and
the printer comprising:
a display device; and
a second storage device configured to store the prepared print layout data, the prepared screen layout data, and a second program enabling a processor of the printer to:
cause the display device to display the screen layout corresponding to the prepared screen layout data;
accept, at the input field of the screen layout, the input of the second print information corresponding to the variable print object; and
cause the printer to print, on a print medium, the first print information and the second print information in accordance with the print layout.

2. The system according to claim 1,
wherein the prepared print layout data includes a print layout ID that identifies the print layout, a print object ID that identifies the print object, first position information that indicates a print position of the print object, and type information that indicates a type of the print object, and
the first storage device is configured to store the print layout ID, the print object ID, the first position information, and the type information in associated fields.

3. The system according to claim 2,
wherein the prepared screen layout data includes a screen layout ID that identifies the screen layout, the print object ID, and second position information that indicates a position of the input field, and
the first storage device is configured to store the screen layout ID, the print object ID, and the second position information in associated fields.

4. The system according to claim 3,
wherein the prepared screen layout data further includes reference information to be referenced when accepting the input of the second print information, and
the first storage device is configured to store the print object ID and the reference information in associated fields.

5. The system according to claim 3,
wherein the prepared screen layout data further includes input rule information that indicates an input rule corresponding to a type of the print object, and
the first storage device is configured to store the print object ID and the input rule information in associated fields.

6. The system according to claim 3,
wherein the first storage device is configured to store a print item ID that identifies a print item being a combination of the print layout and the screen layout, and
the print item ID, the print layout ID, and the screen layout ID are stored in associated fields.

7. The system according to claim 1,
wherein the display device is configured to display the screen layout in a first screen and the print layout in a second screen.

8. A method of operating an information processing apparatus configured to communicate with a printer, the method comprising:
preparing, by the information processing apparatus, print layout data in accordance with an instruction of a user, the prepared print layout data indicating a print layout including first print information corresponding to a print object that includes a fixed print object and a variable print object;
preparing, by the information processing apparatus, screen layout data in accordance with the prepared print layout data, the prepared screen layout data indicating a screen layout including an input field configured to accept an input of second print information corresponding to the variable print object;
transmitting, by the information processing apparatus, the prepared print layout data and the prepared screen layout data to the printer;
displaying, by a display device of the printer, the screen layout corresponding to the prepared screen layout data;
accepting, by the printer, the input of the second print information to the input field included in the screen layout; and
printing, by the printer, on a print medium, the first print information and the second print information in accordance with the print layout corresponding to the prepared print layout data.

9. The method according to claim 8,
wherein the prepared print layout data includes a print layout ID identifying the print layout, a print object ID identifying the print object, first position information indicating a print position of the print object, and type information indicating a type of the print object, and the method further comprises storing, at a storage device, the print layout ID, the print object ID, the first position information, and the type information in associated fields.

10. The method according to claim 9,
wherein the prepared screen layout data includes a screen layout ID identifying the screen layout, the print object ID, and second position information indicating a position of the input field, and the method further includes storing, at the storage device, the screen layout ID, the print object ID, and the second position information in associated fields.

11. The method according to claim 10,
wherein the prepared screen layout data further includes reference information to be referenced to when accepting the input of the second print information, and the method further includes storing, at the storage device, the print object ID and the reference information in associated fields.

12. The method according to claim 10,
wherein the prepared screen layout data further includes input rule information that indicates an input rule corresponding to a type of the print object, and the method further includes storing, at the storage device, the print object ID and the input rule information in associated fields.

13. The method according to claim 10, further comprising storing, at the storage device, a print item ID identifying a print item being a combination of the print layout and the screen layout, wherein the print item ID is stored in associated fields with the print layout ID and the screen layout ID.

14. The method according to claim 8, further comprising displaying, at the display device, the screen layout on a first screen and the print layout on a second screen.

\* \* \* \* \*